United States Patent
Polehn et al.

(10) Patent No.: US 10,270,508 B2
(45) Date of Patent: Apr. 23, 2019

(54) RETRO-DIRECTIVE METAMATERIAL ARRAY ANTENNA SYSTEM

(71) Applicant: Verizon Patent and Licensing Inc., Basking Ridge, NJ (US)

(72) Inventors: Donna L. Polehn, Bellevue, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/711,973

(22) Filed: Sep. 21, 2017

(65) Prior Publication Data

US 2019/0089433 A1 Mar. 21, 2019

(51) Int. Cl.
| | |
|---|---|
| *H04B 1/38* | (2015.01) |
| *H04L 5/16* | (2006.01) |
| *H04B 7/06* | (2006.01) |
| *H04L 5/00* | (2006.01) |
| *H04W 16/28* | (2009.01) |
| *H01Q 3/36* | (2006.01) |
| *H01Q 1/24* | (2006.01) |
| *H01Q 1/36* | (2006.01) |
| *H01Q 21/06* | (2006.01) |
| *H04W 88/08* | (2009.01) |

(52) U.S. Cl.
CPC .......... *H04B 7/0617* (2013.01); *H04L 5/001* (2013.01); *H04W 16/28* (2013.01); *H01Q 1/246* (2013.01); *H01Q 1/364* (2013.01); *H01Q 3/36* (2013.01); *H01Q 21/065* (2013.01); *H04W 88/08* (2013.01)

(58) Field of Classification Search
CPC ...... H04B 7/0617; H04L 5/001; H04W 16/28; H04W 76/10; H04W 88/08; H01Q 3/36; H01Q 1/246; H01Q 1/364; H01Q 21/065; H01Q 3/24; H01Q 3/04
USPC ................................ 375/219, 220, 222, 260
See application file for complete search history.

(56) References Cited

U.S. PATENT DOCUMENTS

| | | | | |
|---|---|---|---|---|
| 7,162,273 B1 * | 1/2007 | Abramov | ................. | H01Q 3/04 342/383 |
| 8,571,494 B2 * | 10/2013 | Budianu | ............... | H04W 76/10 455/102 |
| 2014/0253380 A1 * | 9/2014 | Choi | ........................ | H01Q 3/24 342/367 |

* cited by examiner

*Primary Examiner* — Phuong Phu

(57) ABSTRACT

Methods and systems for communication between a network base station and a remote device are disclosed. Disclosed methods include providing, at a base station coupled to the network, a modulated signal to mixers in a retro-directive metamaterial antenna, and receiving an RF transmission beam from the remote device, at the retro-directive metamaterial antenna, and radiating from the antenna a modulated retro-directed beam, using mixer products, directed toward the remote device.

20 Claims, 11 Drawing Sheets

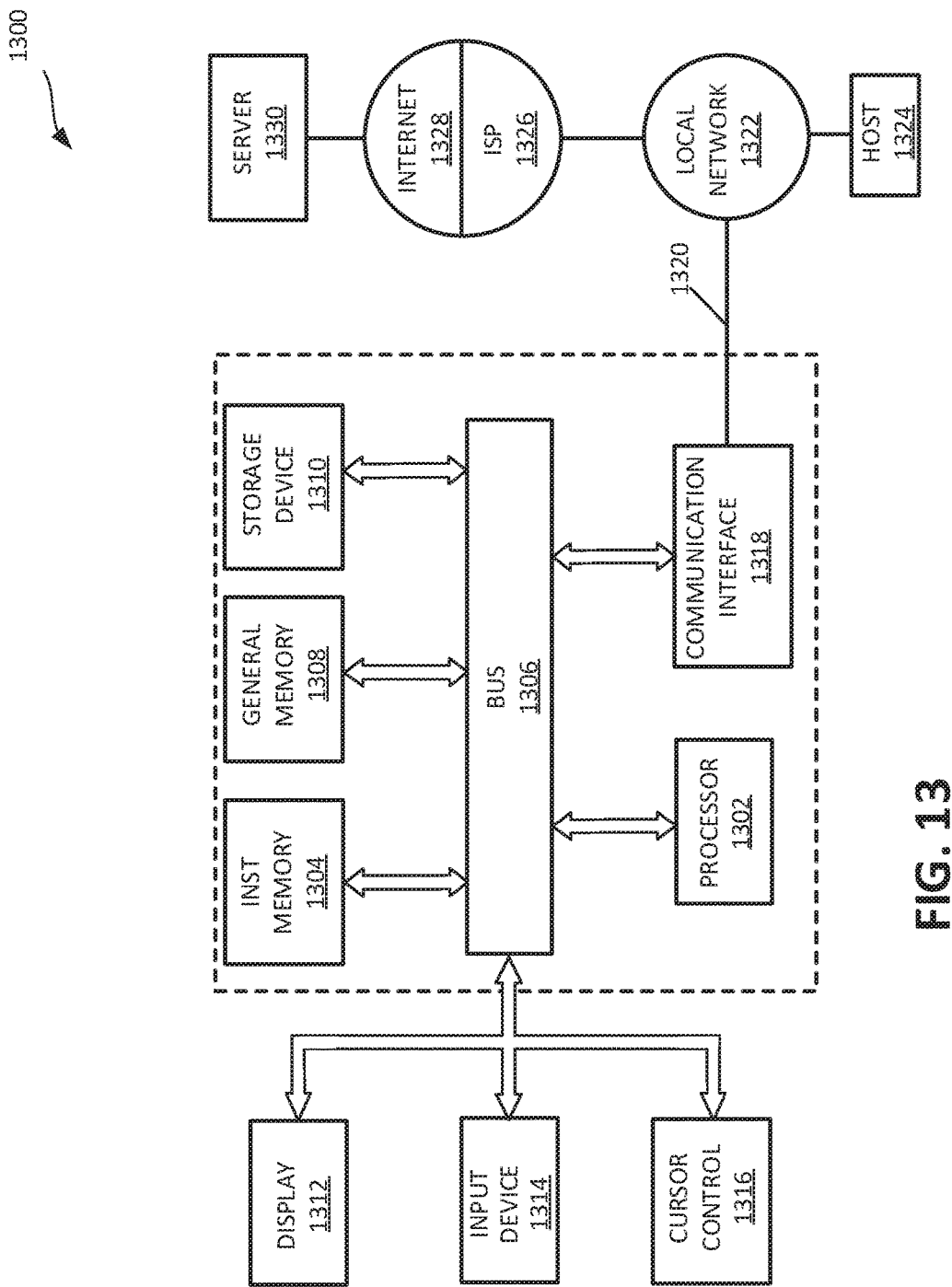

RETRO-DIRECTIVE METAMATERIAL ARRAY ANTENNA SYSTEM

BACKGROUND

Large scale cellular networks can include a distribution of base stations, each connected to an antenna mounted on a cell tower, for serving a respective cell area. The target density of the distribution of cell towers is such that gaps between cell areas are few in number, and are typically located in unpopulated regions. The necessary cell tower density, in terms of towers per unit area, is therefore determined in part by the size of the cell area, i.e., the area that each tower can serve. Factors determinative of the size of the cell area include the power levels radiated by the cell tower and by the user devices, and by the propagation characteristics of the radio signals by which the cell tower and the user devices communicate. Propagation characteristics include the ability to penetrate building walls, and are determined in part by the frequency of the radio signal. For example, current third generation (3G), fourth generation (4G) and Long-Term Evolution (LTE) systems use signals in frequency ranges that sufficiently penetrate many types of building walls to enable communication with interior user devices, and are generally not impeded by foliage.

The frequency spectrum used by cellular networks is expanding, for reasons such as fifth generation (5G), to include frequencies of 14 GHz and higher. The wavelengths at such frequencies are in the millimeters. Millimeter wave signals, however, do not generally propagate as well in cell environments as do lower frequencies. For example, mm waves can be obstructed by building walls and substantially attenuated by foliage. The result can be significantly smaller cell area than available with frequencies typically used by 3G, 4G and LTE systems. A potential solution is to install a higher density of cell towers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 13 is a block diagram illustrating a computer system 1300 upon which aspects of this disclosure may be implemented

DETAILED DESCRIPTION

Figure 1:
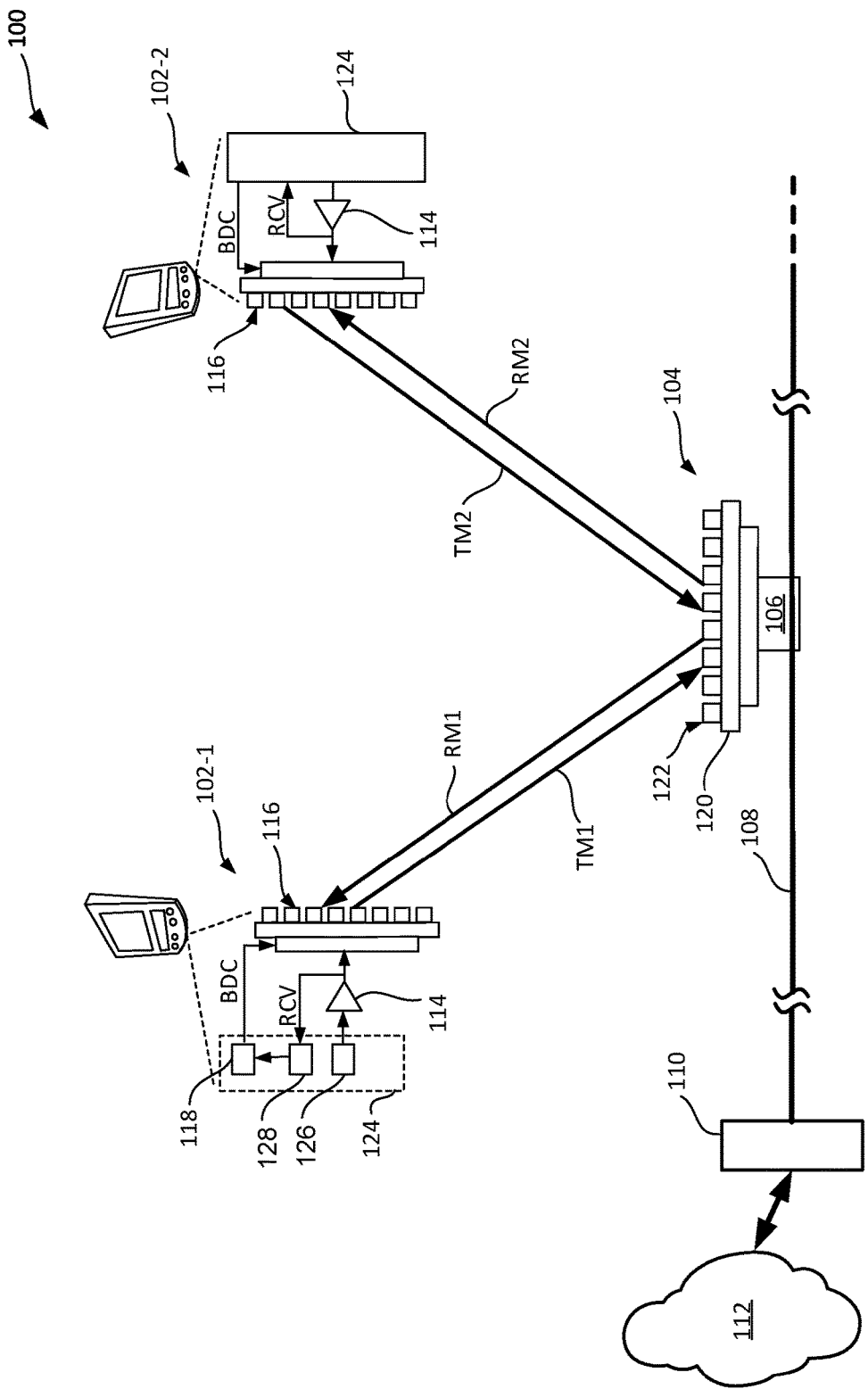
FIG. 1 illustrates a simplified schematic of an implementation of one or more retro-directed metamaterial antenna cellular communication systems and methods.

In the following detailed description, numerous specific details are set forth by way of examples in order to provide a thorough understanding of the disclosed subject matter. It will be apparent to persons of ordinary skill, upon reading this description, that various aspects can be practiced without such details.

In one implementation, a retro-directed metamaterial antenna array cellular communication system can include a base station device and one or more user devices that are located within a given distance and direction from the base station. In an aspect, the base station and user devices can have fixed positions. A user device can be implemented, for example, in a set-top box. In an aspect, the user device can include an electronically steerable beam antenna, fed by a mm wave power amplifier which is in turn fed by the user device. A mm wave receiver can be coupled to the electronically steerable beam antenna. An implementation of the base station device can include a retro-directed metamaterial antenna, configured with mixers that can cause the antenna to radiate a retro-directed beam, corresponding to the transmission beam, back toward the source.

The user device can include a controller for the electronically steerable beam antenna, to control the direction of the beam. When the beam direction is such that the transmitted mm wave signal is incident on the retro-directed metamaterial antenna of the base station, that antenna will radiate a mm wave retro-directed beam back in the direction of incidence. In other words, the retro-directed metamaterial antenna of the base station will return a mm wave beam back toward the user device. The electronically steerable beam antenna of the user device has reciprocal directionality, meaning that it receives in the same direction that it transmits. The user device antenna can therefore receive the retro-directed beam corresponding to its transmitted mm wave signal.

In one implementation, the base station can be configured to modulate the retro-directed beam to carry data to the user device.

The user device mm wave receiver can be configured to measure the signal strength of the retro-directed beam. The user device controller can utilize the measurement to perform a sweep or scan search process, for example at start-up, to find a base station on which to lock. The mm wave signal source can be configured, for example by instructions from the controller, to generate the mm wave beam with a form or characteristic unique to the user device.

For brevity, the following are among abbreviations used in this description:
"BS"—"base station,"
"UD"—"user device,"
"ESB—" electronically steerable beam,"
"SBD"—"steerable beam user device,"
"BDC"—"beam direction command,"
"RDMA"—"retro-directed metamaterial antenna,"
"MPA"—"millimeter wave power amplifier,"

It will be understood that the abbreviations identified above are arbitrarily groups of alphanumeric characters having no intrinsic meaning, and that replacing any one or more of the abbreviations, or each and every of the abbreviations, with the term it abbreviates will effectuate no change in content or meaning of this written description.

FIG. 1 illustrates a simplified schematic of one implementation of a retro-directive metamaterial antenna cellular communication system 100, hereinafter referred to as "system 100." The system 100 can include a first steerable beam user device (SBD) 102-1 and a second SBD 102-2 that are within a particular mm wave wireless communication range of a retro-directed metamaterial antenna (RDMA) base station (BS) device 104. Also for brevity, the terms "first SBD 102-1" and "second SBD 102-2" will be referenced collectively as "SBDs 102." The RDMA BS device 104 can be connected through a base station link interface 106 to a wide area network (WAN) edge distribution link 108 that connects, for example, through a WAN edge 110, to a WAN 112. In an implementation, the WAN 112 can be provided through the Internet and, in such an implementation, the WAN edge can be provided by an Internet Service Provider (ISP) or other Internet access entity, and the distribution link 108 can be a "last mile" distribution line, e.g., a fiber-optic cable, of an ISP.

Referring to FIG. 1, the RDMA BS device 104 can be fixed mounted, e.g., to a tower, telephone pole, certain lampposts, or other supporting structure. The SBDs 102 can also be fixed mounted. One example can be a device within or attached to, or a distributed functionality within set-top boxes associated, for example, with multimedia players on the premises of one or more users (not explicitly visible in FIG. 1). The SBDs 102 can each include a UD mm wave radio frequency (RF) power amplifier (MPA) 114, configured to feed an input/output (I/O) port (not explicitly visible in FIG. 1) of an electronically steerable beam (ESB) antenna 116. Implementations of the ESB antenna 116 are described in greater detail in later sections. In overview, the ESB antenna 116 can be implemented, for example, as a metamaterial scanning array, configured to receive a beam direction command (BDC) generated, for example, by a UD controller 118, and shift or re-direct its beam direction accordingly. In an implementation, the ESB antenna 116 can reconfigure its beam direction by applying BDC to an array of varactors (not visible in FIG. 1), as described in greater detail in later sections.

In an aspect, each SBD 102 can transmit a mm wave RF beam from its ESB antenna 116 that includes a carrier signal at a frequency $\omega$. The beam can be termed an "active read beam," for reasons that will be described in greater detail in later sections. The specific value $\omega$ can be in a range, for example, including about 14 GHz or lower and extending upward to, and beyond about 30 GHz. That is only an example range of $\omega$ and is not intended as a limitation on values of $\omega$ or ranges of values of $\omega$ at which implementations according to this disclosure can be practiced.

The RDMA BS device 104 can include a BS RDMA apparatus 120. In one or more implementations, the BS RDMA apparatus 120 can include an array of conducting patch elements 122 (hereinafter "patch elements 122") supported, for example, by a printed circuit board (not visible in FIG. 1) or other substrate. The BS RDMA apparatus 120 can also include an array of conjugating mixers (not visible in FIG. 1), each coupled, for example, to a particular one of the patch elements 122. A particular RF oscillator signal, for example, from an oscillator (not visible in FIG. 1) in the RDMA BS device 104, can be distributed to all of the conjugating mixers. In an aspect, the oscillator signal can have a frequency about twice the w frequency of the active read beam transmitted by the ESB antenna 116 of the SBDs 102. When the active read beam arrives at the patch elements 122, it is input to the patch element's associated conjugating mixer. When the active read beam arrives concurrent with the above-described feeding of the oscillator signal, at frequency about $2\omega$, to the conjugating mixers, each mixer mixes the signal with that active read beam received at its associated patch element 122. By operations described in greater detail in later sections, the resulting output from each conjugating mixer can include a conjugate of the active read beam that was incident on the mixer's corresponding patch element 122. The generated conjugate signals can radiate then from that patch element. When the array of patch elements 122 radiate their respective mixer output conjugates, the total of such radiation forms a retro-directed beam emission, in a direction that is automatically aligned with, and reverse to, the direction at which the active read beam was incident on the patch element array. The retro-directed beam is therefore directed toward the specific SBD 102 that transmitted the active read beam.

FIG. 1 illustrates two examples, labeled "RM1" and "RM2," of such retro-directed beam radiation from the BS RDMA apparatus 120, with RM1 being in response to an active read beam, TM1, transmitted by the ESB antenna 116 of the first SBD 102-1, and RM2 being in response to active read beam TM2 transmitted by the ESB antenna 116 of the second SBD 102-2. The retro-directed beam RM1 is in a direction aligned with and backward to the direction of incidence of the active read beam TM1, and therefore toward the ESB antenna 116 of the first SBD 102-1, and the retro-directed beam RM2 is likewise toward the ESB antenna 116 of the second SBD 102-2.

In an implementation, and as will be described in greater detail in later sections, the RDMA BS device 104 can be configured to selectively modulate its BS oscillator signal, prior to input to the conjugating mixers, with BS send data.

A BS send data can include, for example, information received from an entity remote from the RDMA BS device 104, for example, through the WAN 112, the WAN edge 110, the WAN edge distribution link 108, and the base station's link interface 106.

When the above-described active read beam is received at the BS RDMA apparatus 120, concurrent with the above-described modulation of the BS oscillator signal to the conjugating mixers, the outputs of the conjugating mixers carry the modulation. In an aspect, a result is that the retro-directed beam (e.g., retro-directed beam RM1) has a modulation that corresponds to the BS send data modulation of the BS oscillator signal. When received at the SBD 102 that transmitted the active read transmit beam, the modulation can be reversed, e.g., demodulated and decoded, and the BS send data extracted. The BS send data is thereby communicated from the RDMA BS device 104 to the SBD 102.

Regarding power level of the retro-directed beams RM1 and RM2, in an aspect, the RDMA BS device 104 can be configured to operate in a substantially passive manner. The meaning of "passive," in this context, is that the power of the retro-directed beams can be largely provided, in significant part, by the active read transmit beam. Among technical features provided by this aspect, as will be understood by persons of ordinary skill upon reading this entire disclosure, is that the RDMA BS device 104 can be implemented without an RF power amplifier, in contrast to the SBDs 102, which require the MPAs 114.

As described above, SBDs 102 can include a UD controller 118, which can be implemented, for example, as a feature of a UD transceiver device 124. In addition to generating the above-described BDC, the UD controller 118 can be configured to control provision of various UD send signals to the MPA 114, for transmission to the RDMA BS device 104. The UD controller 118 can also be configured to control reception and (as indicated on FIG. 1 arrow labeled "RCV"), decoding of retro-directed beam signals, e.g., retro-directed beams RM1 and RM2, arriving at the ESB antenna 116. The controlled reception and decoding can be configured, generally, as a reverse of the above-described encoding of BS send data and associated modulation of the BS conjugating signal. In an aspect, the UD transceiver device 124 can be further configured to measure a power of the retro-directed beams, e.g., RM1, RM2, as received at the ESB antenna 116.

FIG. 1 illustrates, by a drill-down view of the UD transceiver device 124 of the SBD 102-1, a high level schematic of one example configuration of the transceiver device 124. The configuration visible in the drill-down can be representative for both of the SBDs 102. As illustrated, the UD transceiver device 124 can include the UD controller 118, configured as described above, and coupled to a UD selective coder-modulator 126 and to a UD receiver-decoder 128. The UD selective coder-modulator 126 can be configured, under control of the UD controller 118, to encode UD Send Data into modulated UD signals (not visible in FIG. 1), and provide such modulated signals to the MPA 114. The UD controller 118 can also be coupled to a receiver-decoder 128, which can be configured to decode and recover BS send information from received retro-directed beams, e.g., RM1 and RM2.

As illustrated in FIG. 1, the UD transceiver device 124 can also include a received signal strength (also referred to as "RSS") measurement device (not visible in FIG. 1), configured to measure power of the retro-directed beams, e.g., RM1 and RM2, arriving at the ESB antenna 116. The UD controller 118 can be further configured to use the measured RSS in performing a "search scan process," directed to finding the RDMA BS device 104, or a nearest usable other installation of a similarly configured RDMA device connected to the WAN edge distribution link 108. The search scan process can be performed, for example, at power up of the SBD 102. In an aspect, the search scan process can be configured to not unconditionally lock onto the first detected RDMA base station, and instead to continue with the scanning beam until an entire "field of view" is scanned. The field of view, if used, can be preset. In an implementation, a default field of view can be a most recent beam direction. The search scan configuration can be implemented, for example, by computer executable code in the instruction memory of the FIG. 1 UD controller 118. In an implementation, network monitor (not explicitly visible in FIG. 1), for example, connected to the WAN 112, can maintain and update a database of RDMA base stations that can indicate, for each RDMA base station, a list of its current steerable beam user devices, e.g., UDBs 102. In an aspect, such a network monitor can be further configured to detect a power level of transmit beams incident on RDMA base stations' RDMA apparatuses, for passive monitoring and, for example, for sending power adjust commands to specific RDMA base stations.

Figure 2:
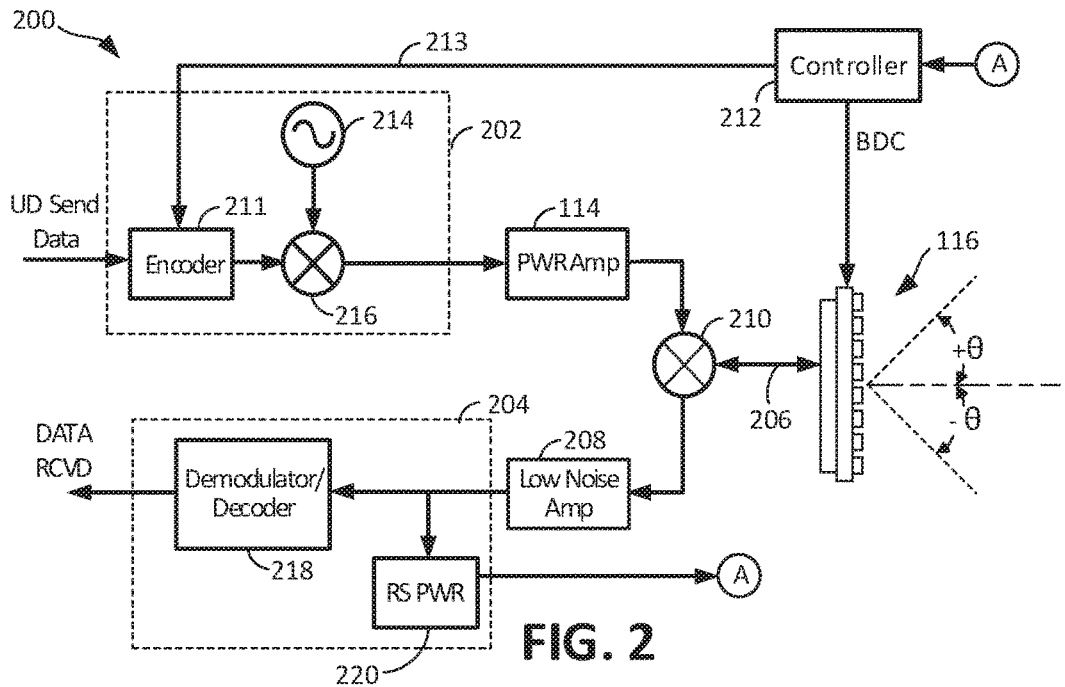
FIG. 2 illustrates a simplified schematic of an implementation of a steerable beam metamaterial array user device in one or more retro-directive metamaterial antenna cellular communication systems and methods.

FIG. 2 illustrates a simplified schematic of an implementation 200 of a steerable powered beam user device (hereinafter "SBD 200"), for one or more RDMA cellular communication systems and methods. The SBD 200 can be an example implementation of one or both of the steerable beam SBDs 102 in the FIG. 1 system 100. To focus on particular features of SBD 200, portions of the system 100 and one of the SBDs 102 thereof are used, with like reference numbers.

Referring to FIG. 2, SBD 200 can include a UD transmit signal source 202 and a UD receiver/decoder 204. An output of the UD signal source can feed the MPA 114, and the MPA's output can be coupled to an input/output (I/O) port 206 of the ESB antenna 116. The I/O port 206 can also connect, through a low noise amplifier 208, to an input of the UD receiver/decoder 204. In the FIG. 2 illustrated implementation, the MPA 114 output and the low noise amplifier 208 can be mutually isolated, for example, through a UD circulator 210. The UD circulator 210, if used, can be implemented, for example, by a conventional technique three-port mm wave circulator.

The UD transmit signal source 202 can include a UD transmit encoder 211, which can be configured to select among and generate different signal types. The selection can be controlled, for example, by instructions provided by a UD controller 212, via logic connection 213. The logic connection 213 can be, for example, a bus or dedicated control lines. The UD controller 212 can be an implementation of the FIG. 1 UD controller 118, further configured, for example by computer executable instructions in its instruction memory, to perform additional functions described for this example SBD 200.

The UD transmit signal source 202 can include a UD transmit oscillator 214 that can be coupled to an input of a UD transmit modulator 216. The UD transmit modulator 216 can have another input coupled to the output of the UD transmit encoder 211. The UD transmit oscillator 214 can be configured to generate, and send to the UD transmit modulator 216, a mm wave UD carrier signal $F(\omega t)$. The UD transmit modulator 216 can be configured to modulate $F(\omega t)$ with an output of the UD transmit encoder 211 and feed the modulation output to the MPA 114. A band-pass filter (not visible in FIG. 2) may be included between an output of the UD transmit modulator 216 and the input of the MPA 114, to remove unwanted modulation signals.

Specific configuration of the UD transmit encoder 211 and UD transmit modulator 216 can be application-specific depending on system choices of coding, modulation, and multiplexing. For example, if the coding scheme is binary phase shift keying (BPSK), the UD transmit modulator 216 can be a switchable phase delay circuit, and the UD transmit encoder 211 can be configured to encode a serial binary UD Send Data into a serial binary phase control signal. As another example, if the coding-modulation scheme is quadrature phase shift keying (QPSK), and the QPSK is to be carried by a single carrier, the UD transmit modulator 216 can be a four-state phase delay, and the UD transmit encoder 211 can be configured to encode UD Send Data into a concatenation of two-bit blocks, then feed the UD transmit modulator 216 a stream of quadrature phase control values, each corresponding to one two-bit block. In an aspect, the UD transmit encoder 211 and the UD transmit modulator 216 can be configured to provide orthogonal frequency division multiplexed (OFDM) encoding and multiplexing. As will be described in greater detail in later sections of this disclosure, an OFDM configuration can include in the UD transmit encoder 211 a means to encode UD Send Data into blocks of multiple symbols, which are carried by multiple OFDM sub-bands. Moreover, in an OFDM implementation, the UD transmit modulator 216 may include an in-phase modulator and a quadrature modulator (not visible in FIG. 2), and means for summing (not visible in FIG. 2) the modulators' respective outputs for input to the MPA 114.

To reduce interference to the receiver/decoder 204, the SBD 200 can include a receive bandpass filter (not visible in FIG. 2) positioned, for example, prior to the input to the low noise amplifier 208, or between the amplifier 208 and the input to the UD receiver/decoder 204. In addition, the UD receiver/decoder 204 can include a UD decoder 218, configured to output recovered data, labeled in FIG. 2 as "Data RCVD." Implementation of the UD decoder 218 can depend in part on the coding, modulation, and multiplexing applied by the RDMA BS device 104, e.g., the specific coding and modulation of its BS oscillator signal to carry BS Send Data. For example, if the RDMA BS device 104 uses BPSK encoding, the UD decoder 218 can include a BPSK receiver. As another example, if the RDMA BS device is configured for OFDM sending—via coding carried by modulated retrodirected beams, as described—the UD decoder 218 can include an OFDM receiver, examples of which are described later in this disclosure.

Among signal types generated by the UD transmit encoder 211 can be an encoding of the UD Send Data, for subsequent sending from the SBD 200 to the RDMA BS device 104. Examples of UD Send Data can include, but are not limited to, user documents, photos, multimedia files, subscription information, or any other data. The UD Send Data can be provided, for example, by a data storage resource (not visible in FIG. 2) installed in the SBD 200, or can be provided by any of various devices external to the SBD 200, for example, a portable or stationary multimedia player, or a general purpose computer (not visible in FIG. 2). Such external devices may connect to the SBD 200 through, for example, Bluetooth, Ethernet, or any other suitable means. Another example UD transmit data that can be generated by the UD transmit encoder 211, for example, under control of the UD controller 212, can be a search scan data. The search scan data can be included, for example, in the search scan beam transmitted from the ESB antenna 116 during the above-described scan search process. In an example implementation, the search scan beam can be a variation or mode of the above-described active read beam. The search scan data can include, for example, an indicator of being a search scan beam, and may include an identifier of the SBD 102, its associated user, or both, and other information that can be application-specific.

In an aspect, the SBD 200 can include a received signal power (labeled "RS PWR" in FIG. 2) measurement device 220 that can be coupled, for example, to an output of the low noise amplifier 208. The output of the received signal power measurement device 220 can indicate, for example, the received power of any retro-directed beams. The received signal power measurement device 220 can be coupled to the UD controller 212, for us in identifying the nearest RDMA BS device 104, during the above-described scan search process.

Figure 3:
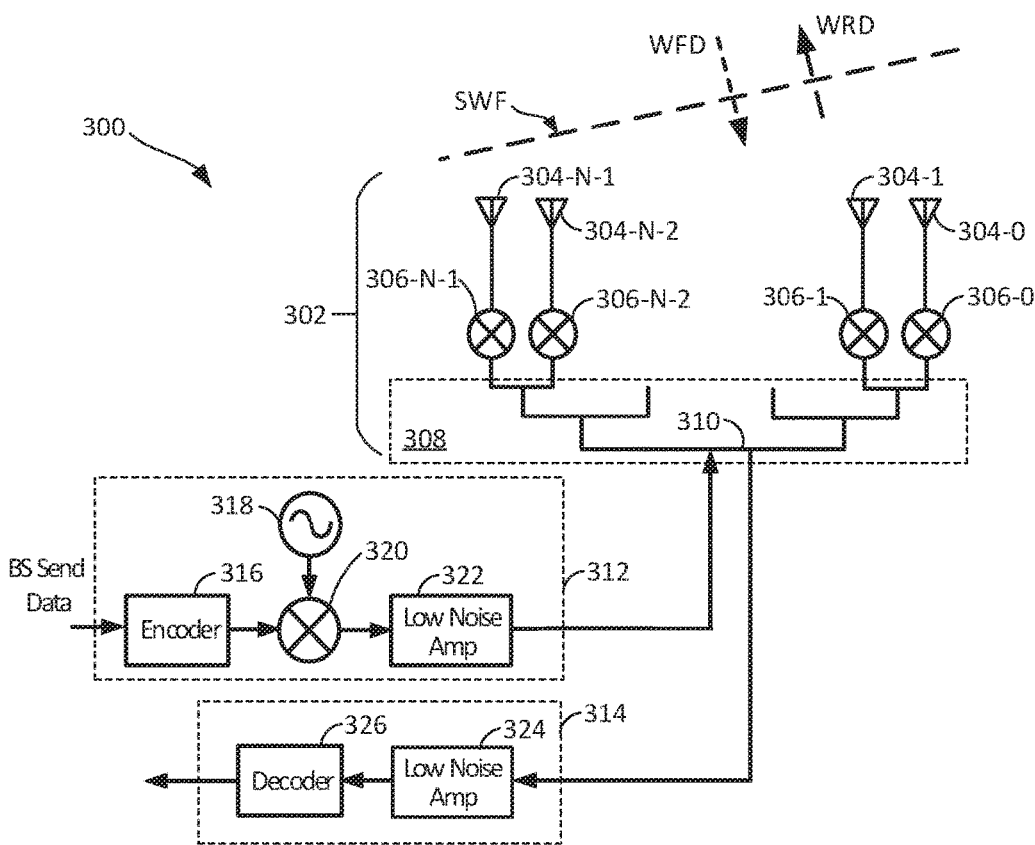
FIG. 3 illustrates a simplified schematic of an implementation of a retro-directive metamaterial antenna base station device in one or more retro-directive metamaterial antenna cellular communication systems and methods.

FIG. 3 illustrates a simplified schematic of an implementation 300 of a RDMA BS device 104 (hereinafter "RDMA BS device 300") in the FIG. 1 system 100. The RDMA BS device 300 can include a BS RDMA apparatus 302 which can be implemented, for example, according to the BS RDMA apparatus 120. The FIG. 3 example BS RDMA device 302 can include an array of N conductor elements, N being an integer, and these are graphically represented on FIG. 3 as antenna elements, of which representative ones are numbered 304-0, 304-1, . . . 304-N–2, 304-N–1. The conductor elements can be conductive patches, formed, for example, of copper. For description, the N conducting elements 304-0, 304-1, . . . 304-N–2, and 304-N–1 will be referenced collectively as "patch elements 304." The patch elements 304 can be implementations of the FIG. 1 patch elements 122.

FIG. 3 illustrates the array of patch elements 304 as a one-dimensional array. Implementations of the patch elements 304, though, can include a two-dimensional array of conducting elements supported, for example, by a printed circuit board (not visible in FIG. 3) or other substrate. Example implementations of the BS RDMA apparatus 302, including two-dimensional arrays pf patch elements, are described in greater detail later in this disclosure. The patch elements 304 can, however, be implemented as a one-dimensional array. To avoid obfuscation of concepts, description in reference to FIG. 3 of parameters such as "angle of incidence," "beam direction," and the like, will be described in the plane of FIG. 3. Persons of ordinary skill, upon reading the present disclosure, can readily apply the described examples to two-dimensional array implementations of the patch elements 304.

Referring to FIG. 3, the BS RDMA apparatus 302 can include an array of M mixers, M being an integer, and the examples are illustrated as circles with superposed graphical "Xs," and numbered 306-0, 306-1, . . . 306-N–2, 306-N–1. For purposes of description, the mixers 306 will be alternatively referenced as "conjugating mixers 306." Implementation of the conjugating mixers 306 can include varactor, for example, a varactor diode. In one or more implementations, M and N can be equal, enabling a 1:1 correspondence of patch elements 304 to conjugating mixers 306. M and N being equal, and 1:1 correspondence of patch elements 304 to conjugating mixers 306, are only example configurations, and do not limit the scope of implementations of the BS RDMA device 302.

The illustrated BS RDMA apparatus 302 can include an arrangement of conductors 308, configured to couple each conjugating mixer 306 to a common input/output (I/O) 310. For purposes of description, the tree of line segments 308 will be collectively referred to as a "BS signal distribution tree 308." The BS signal distribution tree 308 can be implemented, for example, as metal traces disposed on a side of a printed circuit board or other substrate opposite the side supporting the patch elements 304. Examples are described in greater detail later in this disclosure.

The BS device 300 can include a BS send signal source 312 and a BS receiver/decoder 314. The BS send signal source 312 can include a BS encoder 316 and a BS oscillator 318, each coupled to a corresponding one of two inputs of a BS modulator 320. An output of the BS modulator 320 can input to a first low nose amplifier 322 having an output coupled, for example, directly or through a circulator, to the common I/O 310. In an aspect, the BS oscillator 318 is preferably configured to generate a BS oscillator signal $F(2\omega t)$, i.e., twice the "$\omega$" frequency of SD oscillator 214 of the above-described SBD 200. The frequency of the BS oscillator signal can be set at double the SD oscillator frequency to obtain, by operations of the mixers 306, the above-described conjugation of active read beams and resulting retro-directed beam.

The BS encoder 316 and BS modulator 320 can be configured in an application-specific manner based, for example, on the system choice of coding and multiplexing. For example, if the chosen coding-modulation scheme is BPSK, the BS modulator 320 can be a switchable phase delay circuit, and the BS encoder 316 can be configured to encode a serial binary UD DATA IN into a serial binary phase control signal. If the coding-modulation scheme is QPSK, and is to be carried by a single carrier, the BS modulator 320 can be a four-state phase delay, and the BS encoder 316 can be configured to encode BS Send Data into a concatenation of two-bit blocks, then feed the BS modulator 320 a stream of quadrature phase control values, each corresponding to one two-bit block. In an embodiment, the BS encoder 316 and the BS modulator 320 can be configured to provide OFDM communication. Implementations, can include means to encode BS Send Data into blocks of multiple symbols that are carried on multiple OFDM subbands, and can configure the BS modulator 320 with an in-phase modulator and a quadrature modulator (not visible in FIG. 3), and means for summing (not visible in FIG. 3) the modulators' respective outputs for input to the first low noise amplifier 322.

The first low noise amplifier 322 can be implemented by an amplifier significantly smaller, in terms of output power, than suitable for implementation of the MPA 114. This allows for a substantially lower power consumption and may enable the use of battery-powered implementations of the FIG. 1 RDMA BS device 100, including the implementation of FIG. 3 RDMA BS device 300.

Referring to FIG. 3, the BS receiver/decoder 314 of the RDMA BS device 300 can include a second low noise amplifier 324 and a BS receive decoder 326. The input of the second low noise amplifier 324 can be coupled, for example, through a circulator, to the common I/O 310 of the BS RDMA apparatus 302. The output of the second low noise amplifier 324 can be coupled to an input of the BS receive decoder 326. To reduce interference, a BS receive bandpass filter (not visible in FIG. 3) can be positioned, for example, prior to the second low noise amplifier 324 input, or between the second low noise amplifier 324 and the BS receive decoder 326.

Specific implementation of the BS receive decoder 326 can depend in part on the transmit coding scheme applied by the SBD 102. For example, if the transmit data beam uses single carrier BPSK or QPSK encoding, the BS receive decoder 326 can be implemented with a conventional technique BPSK or QPSK receiver. As another example, if the transmit data beam uses an OFDM scheme for carrying data, the BS receive decoder 326 can be implemented as an OFDM receiver, as will be described in greater detail later.

Figure 4:
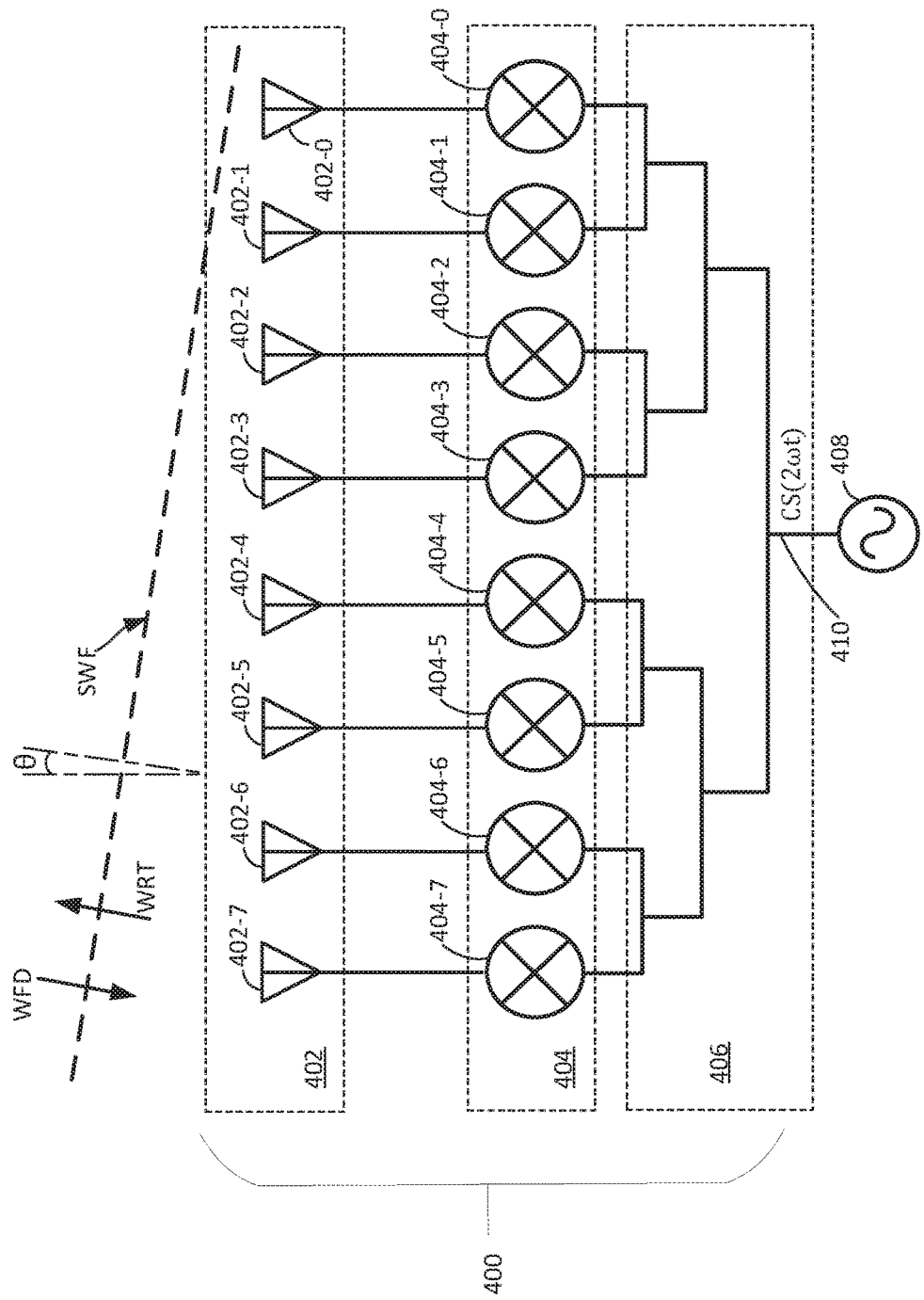
FIG. 4 illustrates analytically determined retro-directed beam wave front, superposed on a circuit schematic of an implementation of a retro-directive metamaterial antenna apparatus in or one or more retro-directive metamaterial antenna cellular communication systems and methods.

FIG. 4 illustrates a particular configuration 400 of the FIG. 3 BS RDMA apparatus 302, with "M" being integer 8, (hereinafter BS RDMA device 400). The BS RDMA device 400 can include an array of 8 patch elements 402, numbered 402-0, 402-1, . . . 402-7. The patch elements 402 can be implementations, for example, of eight adjacent ones of the FIG. 3 patch elements 304. The patch elements 402 can be spaced by distance "D." It will be assumed that D is significantly less than the wavelength of the UD carrier signal $F(\omega t)$.

The BS RDMA device 400 can include an array of eight mixers 404, represented as circles with superposed graphical "Xs," and individually as 404-0, 404-1, . . . 404-7. The mixers 404 can be implementations, for example, of eight adjacent ones of the FIG. 3 conjugating mixers 306. The BS RDMA device 400 can also include an arrangement of conductors, graphically represented as lines 406, configured to couple each mixer 404 to a common I/O 410. The conductors represented by lines 406 will be referred to as "mixer feed tree 406," and can be implemented, for example, as metals traces disposed on a side of a printed circuit board or other substrate opposite the side supporting the patch elements 402. In FIG. 4, oscillator 408 delivers a conjugation signal $CS(2\omega t)$ to the mixer feed tree 406, for distribution to the mixers 404, CS being a sinusoidal function. The frequency, $2\omega$, is twice the frequency $\omega$ of the UD carrier $F(\omega t)$.

The dotted line labeled "SWF" represents a snapshot of a forward wave front ("forward" meaning toward the patch elements 402) labeled "WFD," at a given time, superposed with a later time snapshot, a retro-directed wave front labeled "WRT." The angle of incidence (and the angle of retro-directed radiation) is labeled 0. Conjugation operations effectuating radiation of the retro-directed wave front in an embodiment, will be described.

The forward wave front WFD will arrive at the first patch element 402-0 at time "T0," and will arrive at the second patch element 402-1 at a time T0 plus $\Delta$. For purposes of description, the arrival at the second patch element 402-1 can be expressed in terms of $\Delta\phi$ radians, relative to the carrier signal $F(\omega t)$, according the following Equation (1):

$$\Delta\phi = (2\pi * \sin(\theta))/\lambda \qquad \text{Equation (1)}$$

where $\theta$ is the angle of incidence, and $\lambda$ is the wavelength of $\omega$.

For convenience, it will be assumed that the forward wave front WFD is a scan search transmit beam mode of the above-described transmit beam TM1, and includes a carrier at the above-described frequency $\omega$. Therefore, the signal captured by the snapshot at time T0, as received at the first patch element 402-0 can be according to Equation (2) below:

$$R0(t) = F(\omega t) \qquad \text{Equation (2)}$$

For convenience it will be assumed that F is a sinusoidal function.

Due to the above-described phase shift $\Delta\phi$, the signal arriving at the second patch element 402-1, which will be termed R1(t), can be according to Equation (3) below:

$$R1(t) = F(\omega t + \Delta\phi) \qquad \text{Equation (3)}$$

The transmit beam signal as it successively arrives at each of the third patch element 402-2 through the eighth patch element 402-7, will be termed for purposes of description as R2(t), R3(t), R4(t), R5(t), R6(t), and R7(t), respectively, and can be according to the Equations (4) through (9) below:

$$R2(t)=F(\omega t+2\Delta\phi) \quad \text{Equation (4)}$$

$$R3(t)=F(\omega t+3\Delta\phi) \quad \text{Equation (5)}$$

$$R4(t)=F(\omega t+4\Delta\phi) \quad \text{Equation (6)}$$

$$R5(t)=F(\omega t+5\Delta\phi) \quad \text{Equation (7)}$$

$$R6(t)=F(\omega t+6\Delta\phi) \quad \text{Equation (8)}$$

$$R7(t)=F(\omega t+7\Delta\phi) \quad \text{Equation (9)}$$

As described above, CS(2ωt) is delivered to all of the mixers 404. The mixer product from the first mixer 404-0, RD0(t), can be according to Equation (10) below:

$$RD0(t)=F(\omega t)*CS(2\omega t) \quad \text{Equation (10)}$$

For purposes of description, both F and CS can be assumed as a cosine operator. Therefore, as RD0(t) can be represented as Equation (11) below:

$$RD0(t)=\cos(\omega t)*\cos(2a) \quad \text{Equation (11)}$$

RD0(t) can be written according to the following Equation (12):

$$RD0(t) = \frac{1}{2}\cos(3\omega t) + \cos(\omega t) \quad \text{Equation (12)}$$

In an implementation, a low pass filter (not explicitly visible in FIG. 4) that passes only the lower frequency component of RD0(t) can be incorporated in, or associated with the mixers 404. A scaling can also be incorporated in or applied to the mixing operation. Assuming a scaling of integer 2, the resulting product, RD0(t), from the first mixer 404-0, can be written according to the following Equation (13):

$$RD0(t)=\cos(\omega t) \quad \text{Equation (13)}$$

The product of the second mixer, 404-1, can likewise be termed RD1(t), and by application of the above-described operations, can be written according to the following Equation (14):

$$RD1(t)=\cos(\cot+0)*\cos(2\ \omega t) \quad \text{Equation (14)}$$

The product RD1(t) of the second mixer, 404-1, can be represented as the following Equation (15):

$$RD1(t) = \frac{1}{2}\cos(3\omega t + \phi) + \cos(\omega t - \phi) \quad \text{Equation (15)}$$

Assuming low pass filtering and scaling such as described above for the first mixer 404-0, is applied to the second mixer, 404-1, the mixer result output from the second mixer 404-1 can be written according to the following Equation (16):

$$RD1(t)=\cos(\omega t-\phi) \quad \text{Equation (16)}$$

The mixer output from the second mixer 404-1 is therefore the conjugate of the transmit beam TM-1, as received at the second patch element 402-1. Applying the above-described operations outputting RD1(t) from the second mixer 404-1 to the remaining mixers, 404-2, 404-3, . . . 404-7 and, for each, replacing j with n multiplied by j, for n=2, 3, . . . 7, the respective mixer outputs of the third mixer 404-2 through the eighth mixer 404-7 can be referenced as RD2(t) through RD7(t), and can be written according to the following Equations (17) through (22):

$$RD2(t)=\cos(\omega t-2\phi) \quad \text{Equation (17)}$$

$$RD3(t)=\cos(\omega t-3\phi) \quad \text{Equation (18)}$$

$$RD4(t)=\cos(\omega t-4\phi) \quad \text{Equation (19)}$$

$$RD5(t)=\cos(\omega t-5\phi) \quad \text{Equation (20)}$$

$$RD6(t)=\cos(\omega t-6\phi) \quad \text{Equation (21)}$$

$$RD7(t)=\cos(\omega t-7\phi) \quad \text{Equation (22)}$$

Referring to Equations (16) through (22), a result of the above-described mixing operations is that the output of each of the mixers 404-0 through is 404-7 is the conjugate of the transmit beam TM-1, as received at the mixer 404's corresponding patch element 402.

In an embodiment, the mixers 404 can be configured and arranged such that their respective outputs couple to their corresponding patch element 402. Referring to FIG. 4 and to Equations (16) through (22), a result can be that each patch element 402 radiates a conjugate of the transmit beam TM1 as received at that patch element 402. Therefore, the greater the phase delay in receiving the transmit beam, the greater the relative phase advancement of the conjugate radiation. This, in turn, causes the retro-directed beam to automatically leave the array of patch elements 402 in the direction of incidence, θ, of the transmit beam, as illustrated by the retro-directed wave front WRT.

FIG. 5A illustrates a top projection of a particular configuration 500 of the FIG. 2 ESB 116 (hereinafter "ESB device 500"). FIG. 5B illustrates a cross-sectional view of ESB device 500, viewed from the offset cross projection planes BB-BB of FIG. 5A. Referring to FIG. 5A, the ESB device 500 can include an 8×8 array of patch elements 502 (or any dimension array) supported, for example, by a printed circuit board 504 (partially visible in FIG. 5A) or other substrate. The patch elements 502 can be formed, for example, of copper, silver, or both, or another one or more suitable conductor materials. For purposes of description, FIG. 5A illustrates orthogonal reference axes "X" and "Y," aligned to the example arrangement of the patch elements 502. The patch elements 502 can be spaced distance D apart, along the Y axis. Preferably, D may be significantly less than the wavelength of the UD oscillator signal F(ωt). Spacing along the X axis can be, but is not necessarily identical to D.

Referring to FIG. 5B, patch elements 502-0, 502-1, . . . 502-7 are the patch elements cut by the cross projection plane BB-BB.

Referring to FIG. 5A, ESB device 500 can include an array of phase shifters 504 (visible as hidden lines in FIG. 5A), having an array dimension such as, but not limited to, the illustrated dimension of 8×8. Representatives thereof are visible in FIG. 5B, and are numbered on that figure as 504-0, 504-1, 504-2, . . . 504-7. It will be understood that 8×8 is only an example, and is not intended as any limitation on the size, or number of dimensions of the array.

Figure 5:
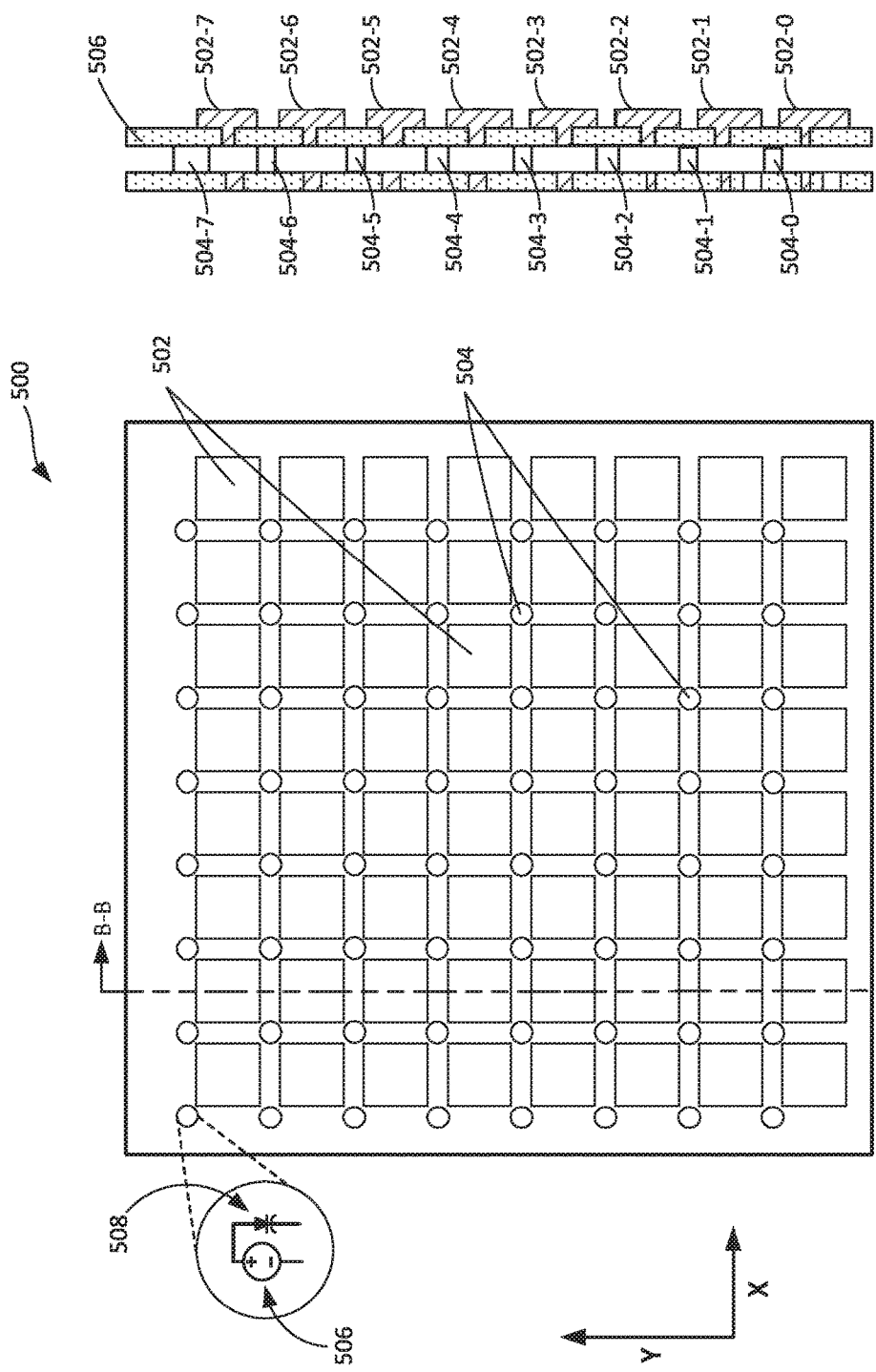
FIG. 5A illustrates a front projection view of an implementation of an electronically steerable beam metamaterial array in or one or more retro-directive metamaterial antenna cellular communication systems and methods.
FIG. 5B illustrates a cross-sectional view of the electronically steerable beam metamaterial array of FIG. 5A, viewed from the FIG. 5A cross-sectional projection B-B, in one or more retro-directive metamaterial antenna cellular communication systems and methods.
Figure 6:
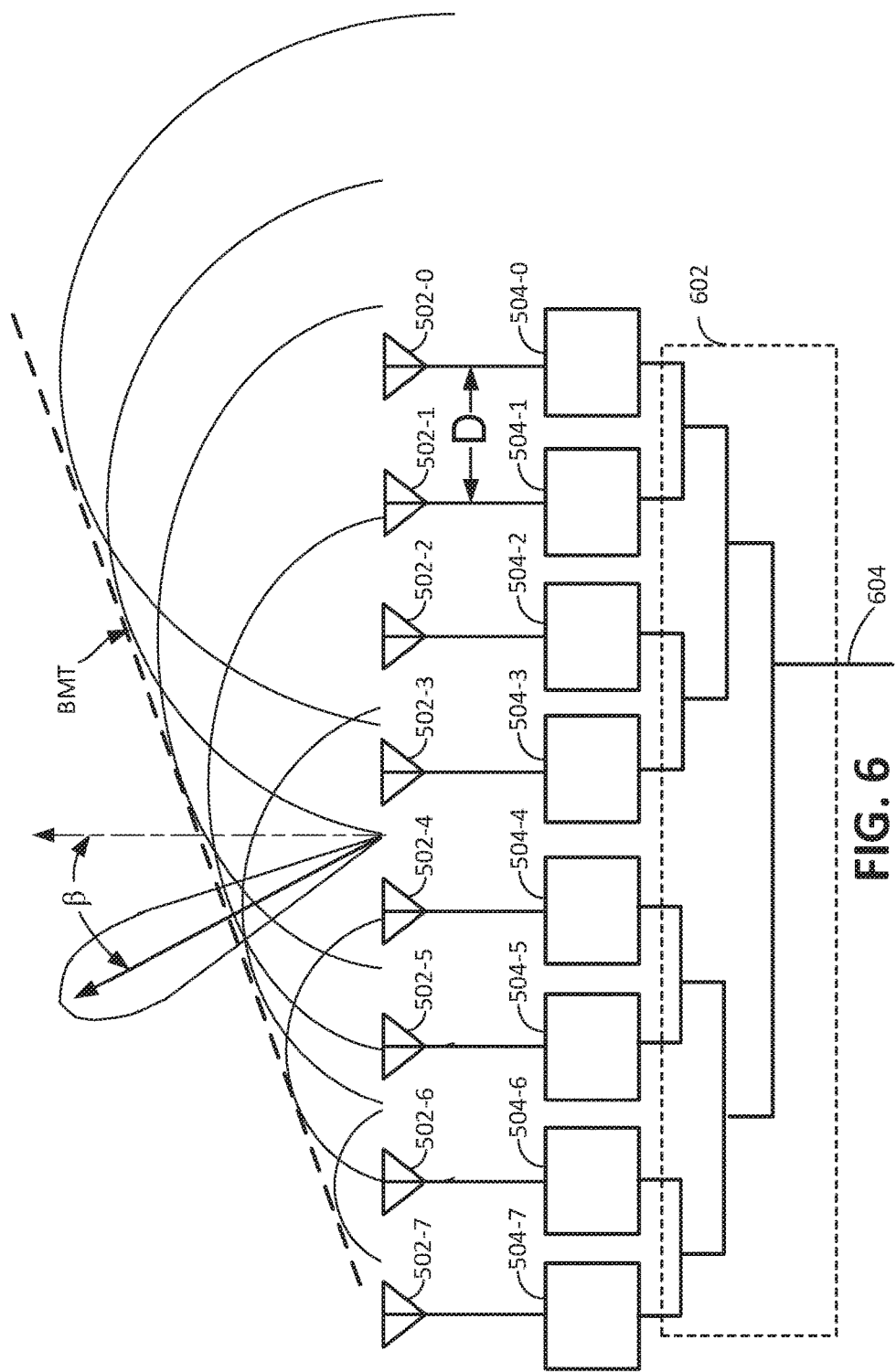
FIG. 6 illustrates a graphical representation of an analytically determined directed beam wave front superposed on a circuit schematic of the FIG. 5A-5B implementation of an electronically steerable beam metamaterial array in or one or more retro-directive metamaterial antenna cellular communication systems and methods.

FIG. 6 illustrates a higher level diagram of the eight patch elements 502 and eight phase shifters 504 that are visible in FIG. 5B. FIG. 6 also illustrates a common signal feed 602 that can extend from an antenna I/O port 604 to an input (visible in FIG. 6 but not separately numbered) of the phase shifters 504. As illustrated in FIG. 6, the first phase shifter 504-0 is in a signal feed path to the first patch element 502-0, and the second through eighth phase shifters 504-1, 504-2, ... 504-7 and 504-3 are respective signal feed paths to the second through eighth patch elements, 502-1, 502-2, ... and 502-7.

In an aspect, phase shifter control lines (not visible in FIGS. 5A-6), to the phase shifters 504 can be provided. The phase shifter control lines can be configured, for example, to carry the above-described BDC (beam direction control) to each of the phase shifters 504. In an aspect, the phase control lines can provide, or enable, an individual logic path for each providing specific phase control signal, or phase control data, to specific phase shifters 504. One implementation can be a separate phase shifter control line for each of the phase shifters 504 in the array, e.g., the example 8×8 array illustrated in FIGS. 5A-6. In another implementation, the ESB device 500 can include a digital-to-analog converter (DAC) for each phase shifter 504 and, for example, all of the DACs can be individually address destinations connected to a bus (not visible in FIGS. 5A-6). Referring to FIG. 5A, enlarged area "B" illustrates a DAC-controlled varactor, including DAC 506 coupled to varactor 508 as an example implementation of the phase shifters 504.

FIG. 6 illustrates a snapshot of a transmission from the patch elements 502-0 through 502-7, forming a wave front BMT propagating at a beam angle θ. The angle θ results from the DAC 506 of the first phase shifter 504-0 having received and stored a control data causing its varactor 508 to apply zero phase shift, in combination with DACs 506 of the second through eighth phase shifters 504-1, 504-2, ... 504-7, having received and stored control data causing them to apply respectively larger phase shifts, for example, 0, 20, 30, 40, 50, 60 and 70, respectively, where "0" can be, but is not necessarily, in radians. It will be understood that example increments in the phase shifts are not intended as limitations. They are only for convenience in describing operations in the context of the example array dimension of 8×8.

Figure 7:
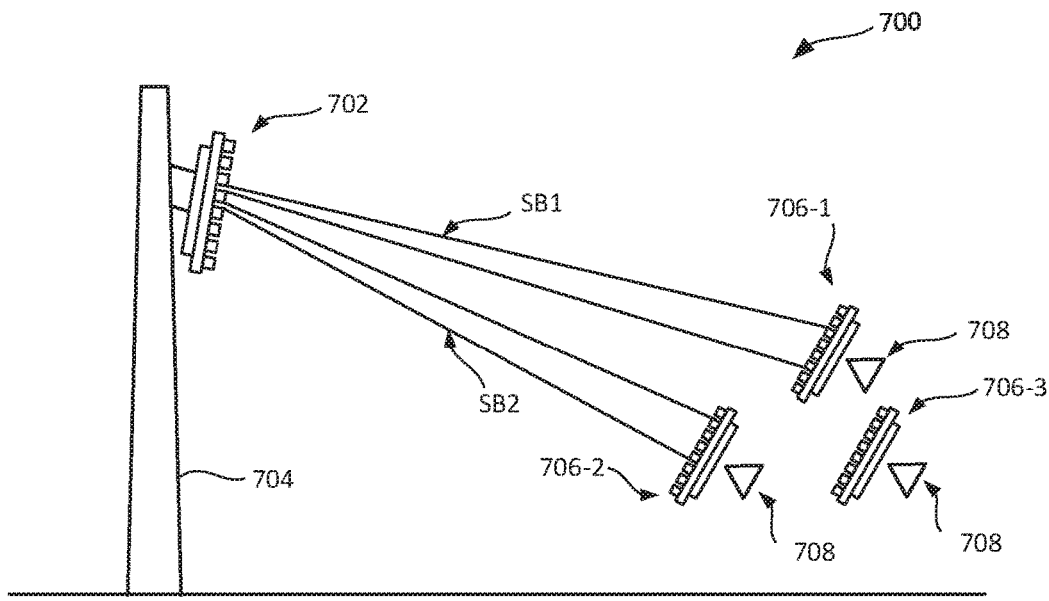
FIG. 7 illustrates analytic examples of steerable beam transmissions, in a simplified schematic of an implementation of one or more retro-directive metamaterial antenna cellular communication systems and methods.

FIG. 7 shows an example retro-directive metamaterial antenna communication system 700 (hereinafter "system 700"). The system 700 can, for example, be an implementation of the system 100. The system 700 can include an RDMA BS device 702 mounted on a tower 704. The RDMA BS device 702 can include an RDMA device (visible in FIG. 7 but not separately numbered), configured such as the BS RDMA apparatus 120. The RDMA BS device 702 can be, for example, according to the FIG. 1 RDMA BS device 104, or its FIG. 3 implementation 300, or both. The system 700 is illustrated with an example population of three steerable beam UDs, including a first steerable beam UD 706-1, a second steerable beam UD 706-2, and a third steerable beam UD 706-3 (collectively "steerable beam UDs 706"). Each of the steerable beam UD 706 includes a mm wave power amplifier 708. The mm wave power amplifier 708 can be an implementation of the FIG. 1 MPA 114. In various applications, extended duration power to the mm wave power amplifier 708 can be provided by locating the steerable beam UDs 706 proximal to a power source.

FIG. 7 illustrates the first steerable beam UD 706-1 transmitting a beam SB1 that arrives at the RDMA device of the RDMA BS device 702, and the second steerable beam UD 706-2 transmitting a similar beam SB2. Either or both of the beams SB1 and SB2 can be an active read beam, for example, to deliver a double frequency carrier to the conjugating mixers of the RDMA device of the RDMA BS device 702, and receive BS data via the resulting modulated retro-directed beam, as described above.

Figure 8:
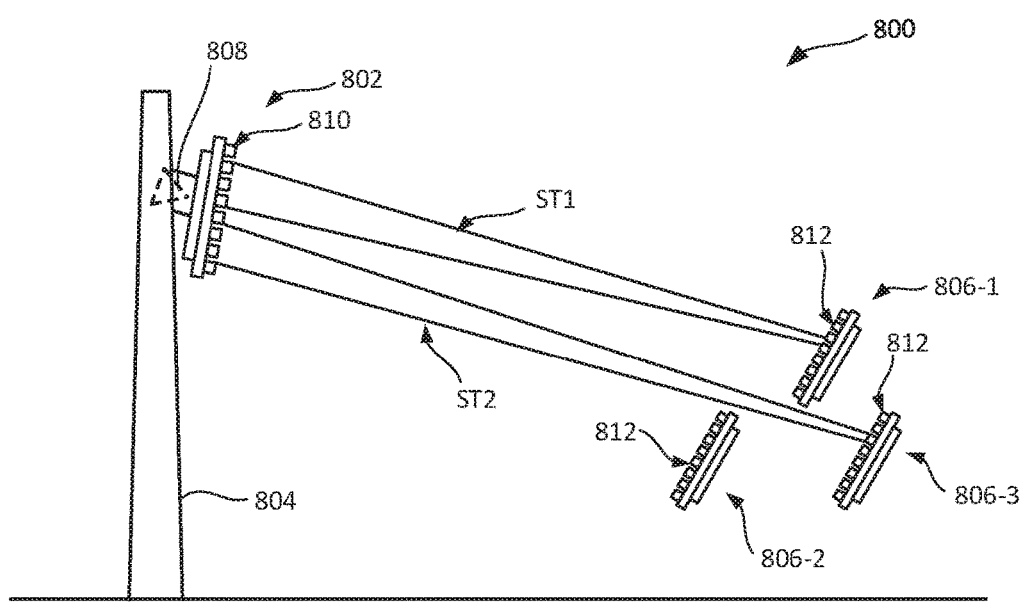
FIG. 8 illustrates a simplified schematic of an example steerable beam metamaterial array base station alternative implementation, in one or more retro-directive metamaterial antenna cellular communication systems and methods.

FIG. 8 shows another embodiment of a retro-directive metamaterial antenna cellular communication system 800. The system 800 is illustrated with a base station 802 mounted to a tower 804, and example user devices, 806-1, 806-2, and 806-3 (collectively "user devices 806"). Base station 802 of system 800 may be configured with an ESB 808, and each of the user devices 806 being configured with an RDMA 810. The base station 802 may be a steerable beam base station 802 and, accordingly, includes a mm wave power amplifier 812. Each RDMA 810 can be, for example, according to the FIG. 1 BS RDMA apparatus 120, or its FIG. 4 implementation. FIG. 8 illustrates the steerable beam base station 802 sending a beam ST1 that arrives at the RDMA device of the user device 806-1, and sending a beam ST2 that arrives at the RDMA device of the user device 806-3. Either or both of the beams ST1 and ST2 can be an active read beam, for example, to provide signal power to the RDMA device of the recipient user device 806, or to send data by a modulated retro-directed beam, as described above.

System 100 of FIG. 1, and system 700 of FIG. 7 illustrate a single RDMA BS device. Contemplated implementations include multiple RDMA base stations that may be distributed in a manner such that one or more steerable beam UDs, such as the SBDs 102 of FIG. 1, can have more than one RDMA base stations within range.

Figure 9:
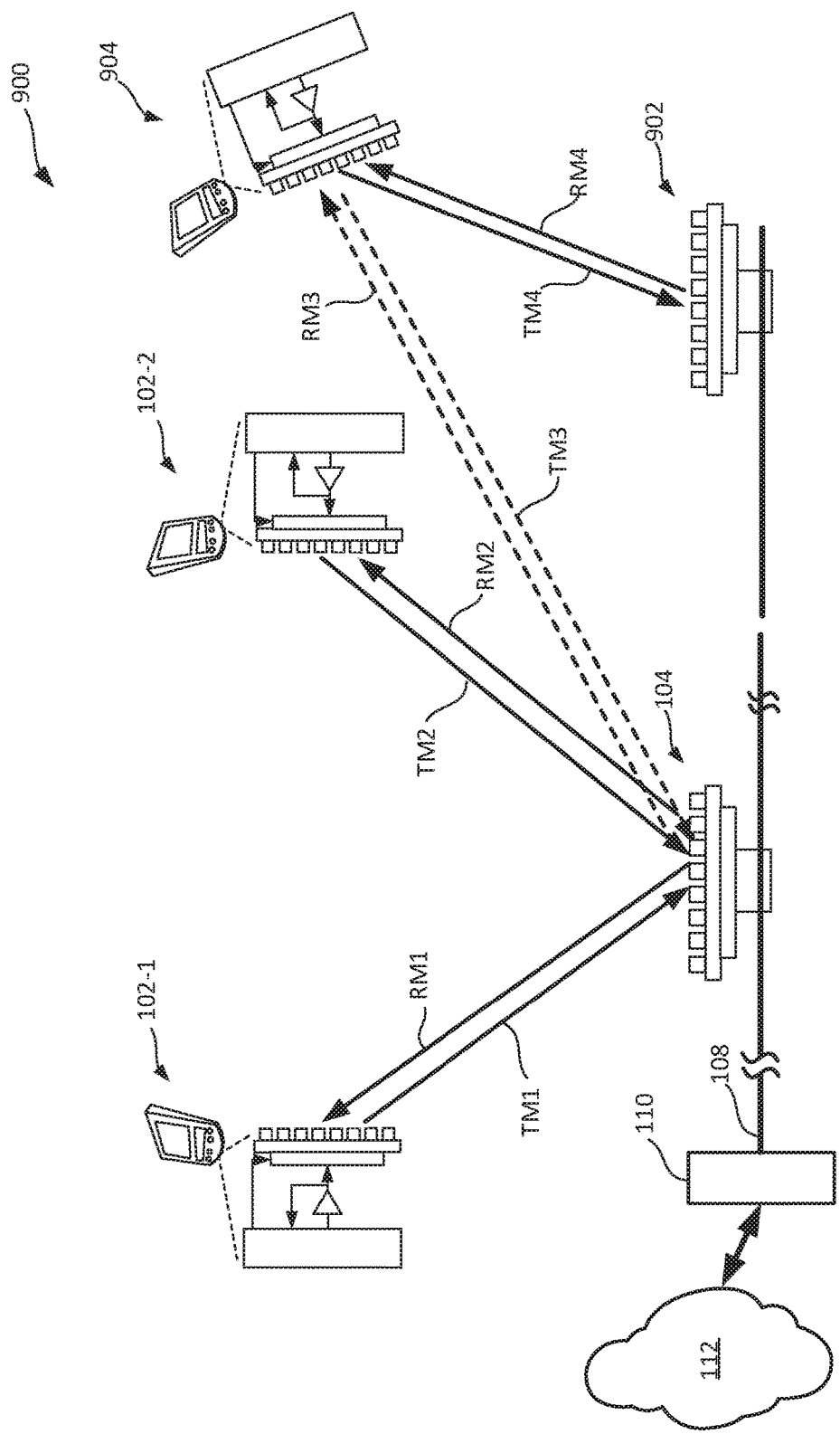
FIG. 9 illustrates a simplified schematic of an example multiple base station implementation of one or more RDMA antenna cellular communication systems and methods, and operations in the implementation of an analytic example search scan.

FIG. 9 illustrates a schematic of one implementation of a multiple base station implementation 900 of one or more RDMA antenna communication systems and methods, and operations in the implementation of an analytic example search scan. To focus on concepts, the system 900 is illustrated as a supplemented configuration of the FIG. 1 system 100, with FIG. 1 components and features having like reference numbers. The system 900 includes a second RDMA base station 902 and a third steerable beam UD device 904 and, as illustrated, assumes that the FIG. 1 RDMA BD device 104 and the second RDMA base station 902 are in range of the third steerable beam UD device 904.

In an example scenario using the assumptions above, the third steerable beam UD device 904 can be powered up or reset and, in response, perform the above described search scan process to identify a closest available RDMA base station. The search process can include the third steerable beam UD device 904 transmitting a search scan beam that, when aligned with the dotted arrow "TM3," strikes the RDMA device (visible in part but not separately numbered) of the second RDMA base station 902, with sufficient power to effect radiation of a retro-directed beam aligned with the dotted arrow "RM3" that reaches the metamaterial ESB array (visible in part but not separately numbered) of the third steerable beam UD 904. In an embodiment, the third steerable beam UD 904 can be configured to not unconditionally lock onto the first detected RDMA base station, and instead to continue with the scanning beam until an entire "field of view" is scanned. In an implementation, the field of view can be preset, or can default to a most recent beam direction. The configuration can include the third steerable beam UD 904 (and all other steerable beam UDs) to select and lock onto the RDMA base station (if any) that returned the strongest retro-directed beam. Such configuration can be implemented, for example, by computer executable code in the instruction memory of the FIG. 1 UD controller 118 or the FIG. 2 controller 212. FIG. 9 illustrates an example in which, subsequent to receiving RM3, the third steerable beam UD 904 received, in response to beam TM4, the stronger retro-directed beam RM4, and correspondingly locked onto the second RDMA base station 902.

Figure 10:
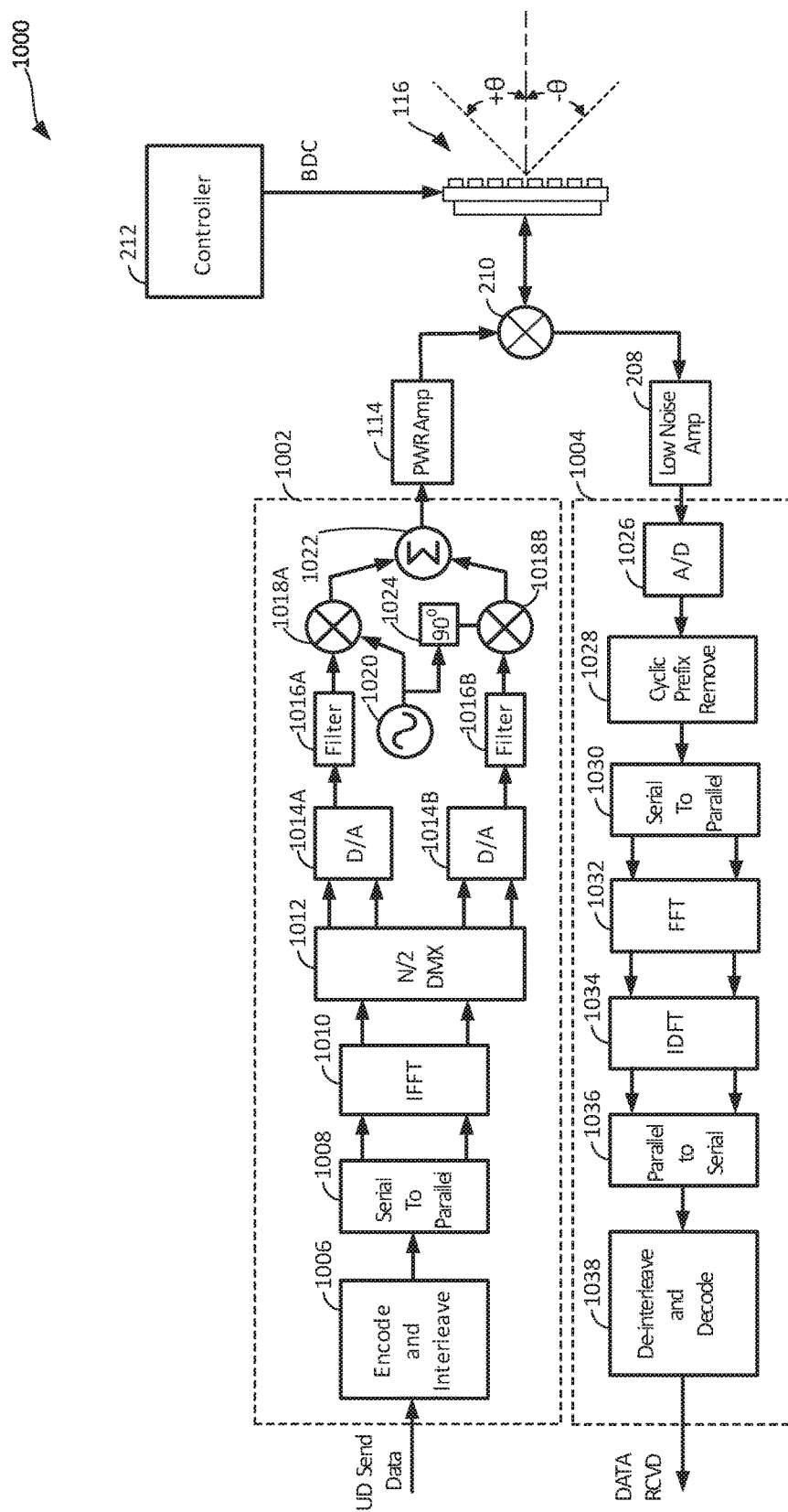
FIG. 10 illustrates a schematic of an implementation of an example orthogonal frequency division multiplexed (OFDM) transceiver, in one steerable beam metamaterial array user device, in one or more retro-directive metamaterial antenna cellular communication systems and methods.

FIG. 10 illustrates an OFDM implementation 100 of the FIG. 2 SBD 200, (hereinafter "steerable beam OFDM SBD 1000"). The steerable beam OFDM SBD 1000 can include an OFDM coder-modulator 1002 and an OFDM demodulation-recover receiver 1004. The OFDM coder-modulator 1002 can be an example implementation of the UD transmit signal source 202 of the FIG. 2 SBD 200. The OFDM demodulation-recover receiver 1004 can be an example implementation of the receiver/decoder 204 of the FIG. 2 SBD 200. The OFDM coder-modulator 1002 can include an encode and interleave block 1006 that can be configured to receive UD Send Data, for example as a serial bit stream, encode the bit stream to a symbol stream, for example, of multi-bit blocks and apply an interleaving. The interleaving can be configured, for example, to spread consecutive bit interference, in accordance with conventional techniques. The encoding can, for example, convert the bit stream into blocks of two bits each. The encoded and interlaced output of block 1006 can be converted, by serial-to-parallel converter block 1008, into parallel blocks, and input to an inverse Fast Fourier Transform (IFFT) block 1010. The parallel blocks can be formed, for example, to include a number of symbols that corresponds to the size (e.g., 16, 32, 64 . . . 128) of the inverse Fourier Transform performed by IFFT block 1010. The output of the IFFT block 1010, can reflect blocks of time domain data, both in-phase and quadrature. The output can be input to an N:2 demultiplexer 1012 that can separate the in-phase time data from the quadrature time data, feeding the former into in-phase digital-to-analog converter (DAC) 1014A, and the latter into quadrature DAC 1014B.

The output of the in-phase DAC 1014A can be an analog signal formed of a combination of K in-phase sub-carriers, K being an integer, modulated as per a block of encoded and interleaved SD Send Data input to the IFFT 1010. The output of DAC 1014A can be filtered by in-phase filter 1016A, and input to in-phase mixer 1018A, where it modulates an oscillator signal that the in-phase mixer 1018A receives from user device oscillator 1020. The oscillator signal can be, for example, the above-described CS(2 ωt). The modulation can produce a frequency translation of the OFDM sub-carriers, up to the mm wave spectrum. The mm wave frequency translated in-phase OFDM signals are input to signal summing block 1022.

The output of filter 1016B can be input to quadrature mixer 1018B, where it can modulate a 90-degree phase shift of the user device oscillator signal. The 90-degree shifted oscillator signal can be referred to as a "quadrature carrier." The 90-degree phase shift can be applied, for example, by the phase shifter 1024. The output modulated quadrature carrier can be another input to the signal summing block 1022, and its summed output can be input to the MPA 114, which transmits it as an OFDM beam from the ESB antenna 116.

The OFDM demodulation-recover receiver 1004, in overview, can be configured to apply, in reverse sequence, the inverse of each of the above-described OFDM transmission operations, to output Data RCVD. Referring to FIG. 10, the OFDM demodulation-recover receiver 1004 can include an analog-to-digital converter (A/D) 1026 configured to receive the output of the low noise amplifier 208, sample it at a suitable sample rate and feed the samples to the cyclic prefix remover block 1028. The A/D converter 1026 is illustrated as receiving signals from the ESB 116 without frequency conversion. Implementations can include a frequency translator (not visible in FIG. 10) prior to the A/D converter 1026, configured, for example, according to conventional OFDM reception techniques. The cyclic prefix remover block 1028 can be configured to remove particular overhead data inserted by the OFDM transmission process. The serial output of the cyclic prefix remover block 1028 can be converted, by serial-to-parallel converter 1030, to blocks that corresponds in size to the FFT size the subsequent FFT block 1032 is configured to apply. The FFT block 1032 output can reflect, for example, a parallel bank of QPSK or quadrature amplitude modulated (QAM) symbol states. The FFT block 1032 output can be input to Inverse Discrete Fourier Transform (IDFT) block 1034, which can translate the bank of symbols state into a parallel bank of time domain data. The parallel bank can be converted to serial form by parallel-to-serial converter 1036, and then input to the decode and de-interleave block 1038 that, applying a process that can be inverse to the process applied by block 1006 of the OFDM transmit section 1002, can recover the data sent by the RDMA base station, e.g., RDMA BS 104.

Figure 11:
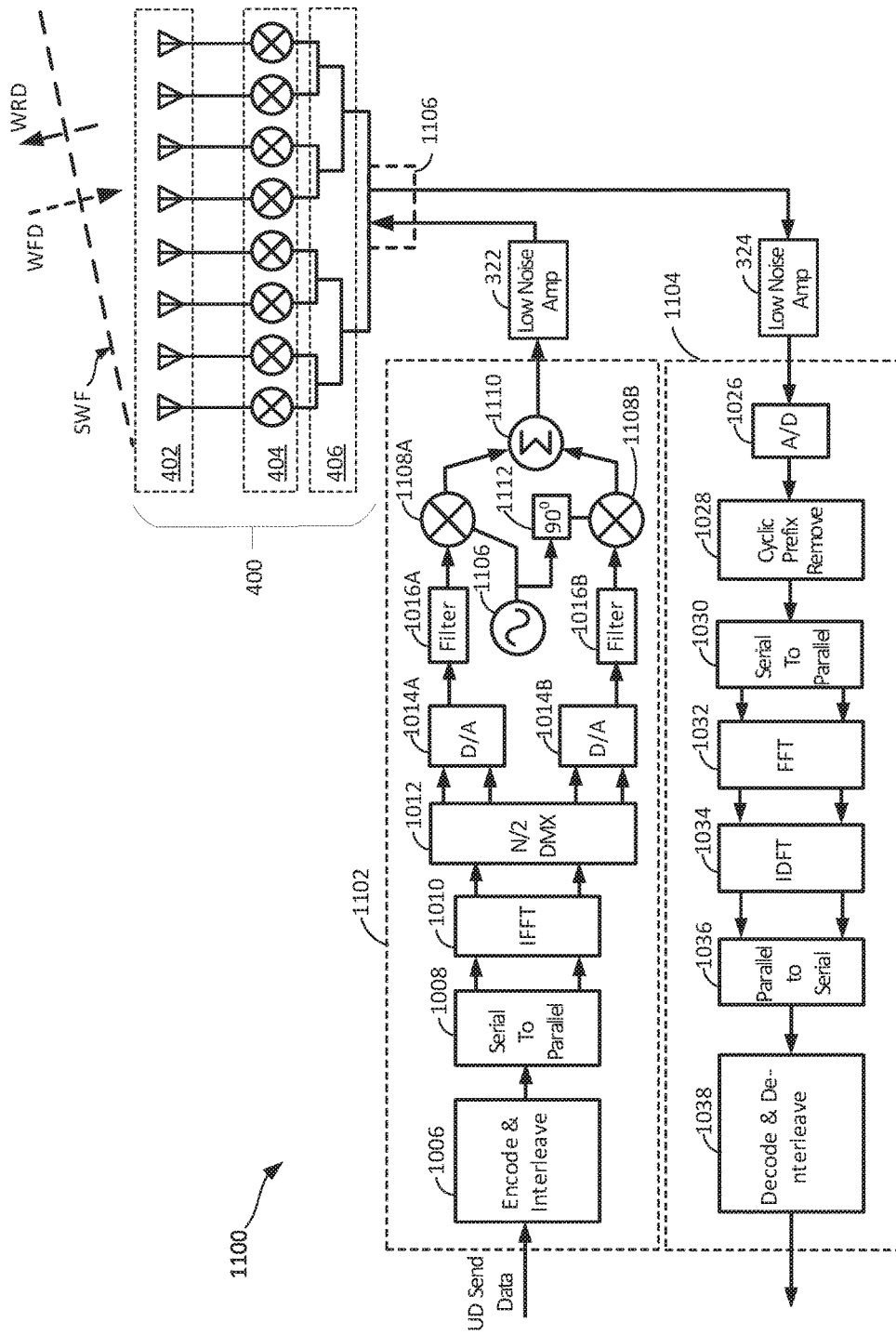
FIG. 11 illustrates a schematic of an implementation of an example OFDM transceiver in one retro-directive metamaterial antenna base station device, in one or more retro-directive metamaterial antenna cellular communication systems and methods.

FIG. 11 illustrates an OFDM implementation 1100 of RDMA BS device 300 (hereinafter "OFDM RDMA BS 1100"). The illustrated OFDM RDMA BS 1100 can include an OFDM coder-modulator 1102 and an OFDM demodulation-recover receiver 1104. The OFDM demodulation-recover receiver 1104 is illustrated as implemented by the OFDM demodulation-recover receiver 1004. It will be understood that "implemented by the OFDM demodulation-recover receiver 1004" means implemented by an apparatus incorporating an architecture similar to the OFDM demodulation-recover receiver 1004, without limitation as to structure.

OFDM coder-modulator 1102 can be implemented as a modification to the above-described OFDM coder-modulator 1002. In the illustrated example, the modification includes using a base station conjugation oscillator 1106, in place of oscillator 1020, generating a conjugation oscillator signal having a frequency twice the frequency of the carrier of the generated active read beam. The base station conjugation oscillator 1106 can be an implementation, for example, of base station oscillator 318. Other modifications in the OFDM coder-modulator 1102, relative to OFDM coder modulator 1002, is using what may be different conjugation mixers, numbered 1108A and 1108B, a different signal summer, numbered 1110, and a different phase sifter, numbered 1112, due to the higher frequency of the base station conjugation oscillator 1106.

Figure 12:
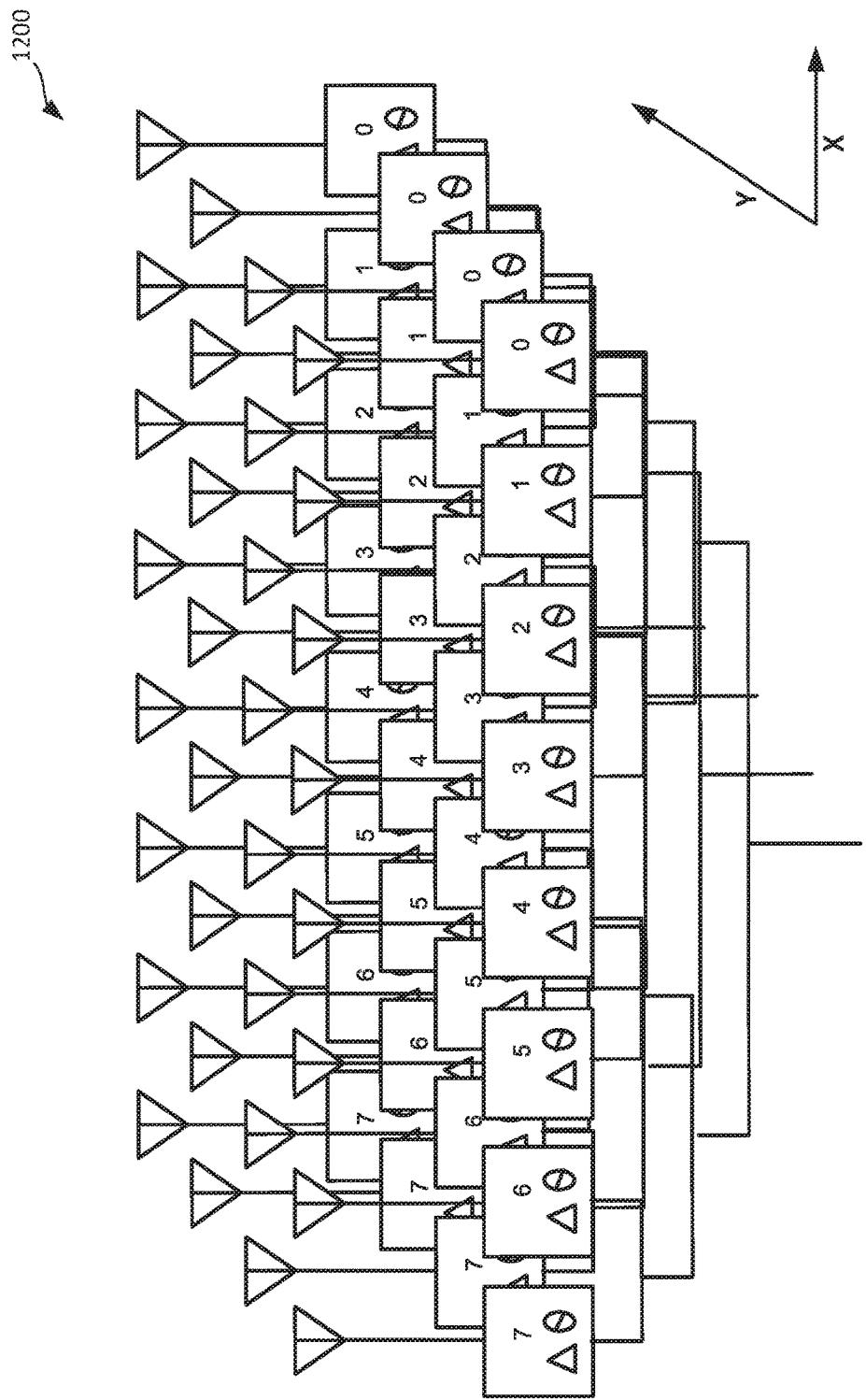
FIG. 12 illustrates a two-dimensional adaptation of the FIG. 6 higher level diagram, reflecting multiple rows or columns of the FIG. 5A illustrated array and interconnection of patch elements and phase shifters.

FIG. 12 illustrates a two-dimensional adaptation of the FIG. 6 higher level diagram, reflecting 4 rows or 4 columns of the FIG. 5A illustrated 8×8 array of patch elements 502 and phase shifters 504, and associated adaptation, to two dimensions, of the FIG. 5B common signal feed 508.

FIG. 13 is a block diagram illustrating a computer system 1300 upon which aspects of this disclosure may be implemented, such as, but not limited to, particular controllers, logic blocks, and controller processes described in reference to FIGS. 1, 2, 3, 9, 10, and 11. It will be understood that logic blocks illustrated in FIG. 13 represent functions, and do not necessarily correspond to particular hardware on a one-to-one basis.

The FIG. 13 illustrated computer system 1300 can include a processor 1302, instruction memory 1304, and a general purpose memory 1308, coupled by a bus 1306. The computer system 1300 can also include a storage device 1310, for example, a large capacity disc drive or solid state drive, coupled to the bus 1306. The instruction memory 1304 can include a tangible medium retrievably storing computer-readable instructions that when executed by the processor 1302 cause the processor to perform operations, such as described for the controller 118 illustrated in and described in reference to one or more of FIGS. 1, 2, 9, and 10.

The computer system 1300 can also include a display 1312, an input device 1314, and a cursor control 1316, all connected to the bus 1306. In various implementations, any two or more of the display 1312, input device 1314, and cursor control 1316 can be implemented with a single hardware apparatus, for example, a touch screen. Example implementations of the input device 1314 can also include, without limitation, removable disc drive, memory stick, Bluetooth, near field communication, and hardwire connection. Implementations of the cursor control 1316 can include, for example, and without limitation, any one or more of a track pad, mouse, joystick, track ball, microphone, and keypad arrows.

The computer system 1300 can also include a communications interface 1318, configured to interface with a local network 1322 for accessing a local server 1330, and to communicate through an Internet service provider (ISP) 1326 to the Internet 1328, and access a remote server 1330.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
    a transmit signal source, configured to generate a radio frequency (RF) signal;
    an RF power amplifier, configured to amplify the RF signal to an amplified RF signal;
    a steerable beam antenna, coupled to the transmit signal source, configured to receive the amplified RF signal and, in response, to:
        transmit an RF transmission beam of the amplified RF signal, and
        receive a modulated retro-directed beam corresponding to the RF transmission beam of the amplified RF signal; and
    a decoder coupled to the steerable beam antenna, and configured to decode the received modulated retro-directed beam and output recovered data,
    wherein:
        the steerable beam antenna is configured to receive a beam direction control signal and, in response, to steer a direction of the RF transmission beam in accordance with the beam direction control signal, and
        the steerable beam antenna includes:
            an RF input/output (I/O) feed,
            an array of patch elements, supported on a surface of a substrate, and
            a plurality of phase shifting elements, supported by the substrate, each of the phase shifting elements configured to receive the beam direction control signal and, in response, to effectuate a phase delay between the RF I/O feed and a corresponding one of the patch elements.

2. The system of claim 1, wherein the system further includes:
    a base station, configured to interface to a network, wherein the base station includes
        a retro-directive metamaterial antenna, and
        a modulated signal generator, coupled to the retro-directive metamaterial antenna, and configured to generate a modulated signal, wherein the retro-directive metamaterial antenna is configured to receive the RF transmission beam and the modulated signal and, in response, generate and radiate the modulated retro-directed beam.

3. The system of claim 2, wherein the steerable beam antenna, the transmit signal source and the decoder are located in a user equipment (UE) that is separate from the base station.

4. The system of claim 2, wherein:
the modulated signal generator includes:
   a modulation signal generator, configured to generate a modulation signal,
   a signal oscillator, configured to generate an oscillating signal,
   a mixer, coupled to the modulation signal generator and to the signal oscillator and configured to receive the modulation signal and the oscillating signal and, in response, generate the modulated signal.

5. The system of claim 4, wherein:
the oscillating signal is a millimeter wave signal,
the modulation signal generator is configured to generate an orthogonal frequency division multiplexed (OFDM) signal, and
the mixer is configured to frequency shift the OFDM signal based on the oscillating signal, to a millimeter wave OFDM signal,
the retro-directive metamaterial antenna is further configured to receive the transmission beam having a carrier at a millimeter wave carrier frequency and, in response to the carrier and the millimeter wave OFDM signal, to generate and radiate the retro-directed modulated beam as a millimeter wave OFDM modulated beam.

6. The system of claim 1, further including:
a controller, configured to generate the beam direction control signal; and
a received signal power measurement device, coupled to the controller,
wherein the controller is further configured to:
   generate a search scan sequence of the beam direction control signal, to cause the steerable beam antenna to steer to each of a plurality of beam directions and, at each of the beam directions,
   cause the transmit signal source to feed a search scan signal to the RF power amplifier to transmit a search scan beam from the steerable beam antenna steered to the scan beam direction,
   based at least in part on a measurement data from the received signal power measurement device, detect whether a retro-directed beam corresponding to the scan search beam is received at the steerable beam antenna, wherein to detect the retro-directed beam corresponding to the scan search beam being received includes to measure a retro-directed beam power,
   based at least in part on the steering, transmitting and detecting, to identify a closest base station, and
   lock the beam direction to the closest base station.

7. The system of claim 1, wherein:
each of the phase shifting elements includes a varactor,
the varactors, the substrate, and the patch elements are configured, in combination, to provide the steerable beam antenna with a metamaterial antenna characteristic.

8. The system of claim 1, wherein:
the decoder is further configured to decode an orthogonal frequency division multiplexed (OFDM) signal carried by the received modulated retro-directed beam.

9. A system comprising:
a retro-directive metamaterial antenna, including
   a substrate,
   a plurality of patch elements supported by the substrate, and
   a plurality of mixers, each mixer coupled to a corresponding patch element among the patch elements; and
a modulated signal generator, configured to provide a modulated signal to the plurality of mixers, the modulated signal including an oscillating signal, the oscillating signal having an assigned frequency
wherein:
   the retro-directive metamaterial antenna is configured to receive a transmission beam from a remote device, the transmission beam including a carrier having a frequency one half the assigned frequency, and
   wherein, each mixer of the plurality of mixers is configured to mix the carrier as received by the retro-directive metamaterial antenna and the modulated signal and generate a mixer product, and to couple the mixer product to the corresponding patch element.

10. The system of claim 9, wherein:
the modulated signal generator is further configured to include, in the modulated signal, an orthogonal frequency division multiplexed (OFDM) signal that includes multiple sub-carriers, and
each mixer product includes the multiple sub-carriers.

11. A method comprising:
generating a radio frequency (RF) signal;
amplifying the RF signal to form an amplified RF signal;
transmitting, from a steerable beam antenna, an RF transmission beam of the amplified RF signal;
receiving a modulated retro-directed beam that corresponds to the RF transmission beam of the amplified RF signal;
demodulating and recovering base station information from the received modulated retro-directed beam;
steering the steerable beam antenna to each of a plurality of scan beam directions and, at each of the scan beam directions;
transmitting a scan search beam from the steerable beam antenna steered to the scan beam direction;
detecting whether a retro-directed beam corresponding to the scan search beam is received at the steerable beam antenna, wherein detecting the retro-directed beam corresponding to the scan search beam being received includes measuring a retro-directed beam power;
based at least in part on the steering, transmitting and detecting, identifying a closest base station; and
locking the beam direction to the closest base station.

12. The method of claim 11, further comprising:
generating, at the closest base station or another base station coupled to a network, a modulated signal;
providing the modulated signal to a retro-directive metamaterial antenna at the base station;
receiving the RF transmission beam at the retro-directive metamaterial antenna;
mixing, at the retro-directive metamaterial antenna, the received RF transmission beam and the modulated signal to generate mixer products; and
radiating, from the retro-directive metamaterial antenna, the modulated retro-directed beam based, at least in part, on the mixer products.

13. The method of claim 12, wherein:
the modulated signal is an orthogonal frequency division multiplexed (OFDM) signal that includes multiple sub-carriers, and
the mixer products include the multiple sub-carriers.

14. A method comprising:
generating, at a base station, a modulated signal, the modulated signal including an oscillating signal, the oscillating signal having a given frequency;
receiving the modulated signal at a retro-directive metamaterial antenna co-located at the base station, the retro-directive metamaterial antenna including an array of patch elements;
receiving, at the array of patch elements, a transmission beam from a remote device, the transmission beam being incident to the array of patch elements with a direction, and the transmission beam including a carrier having a frequency one half the given frequency;
mixing, for each patch element, the modulated signal and the carrier as received by the patch element and generating, as a result, a mixer product associated with the patch element, wherein the mixing couples the mixer product to the patch element; and
radiating from the patch elements, in a direction opposite the direction of the transmission beam, a retro-directed beam including the patch element radiations of the mixer products.

15. The method of claim 14, wherein:
the modulated signal is an orthogonal frequency division multiplexed (OFDM) signal that includes multiple sub-carriers, and each mixer product includes the multiple sub-carriers.

16. The method of claim 14, wherein the carrier has a carrier frequency, and wherein the method further includes:
receiving, at the base station, from an interface connecting the base station to a link to a network edge, a base station data,
generating, at the base station, a base station oscillating signal, the base station oscillating signal having a frequency that is double the carrier frequency, and
generating, at the base station, the modulated signal, based at least in part on the base station data and the base station oscillating signal.

17. The method of claim 16, wherein generating the modulated signal further includes:
encoding the base station data into base station data symbols; and
applying at least a phase modulating to the base station oscillating signal, the at least phase modulating based at least in part on the base station data symbols, and
wherein the modulated signal is based at least in part on a result of the at least phase modulating.

18. The system of claim 10, wherein:
the oscillating signal is a millimeter wave signal, and
the mixer is configured to frequency shift the OFDM signal based on the oscillating signal, to a millimeter wave OFDM signal.

19. The method of claim 15, wherein:
the oscillating signal is a millimeter wave signal, and
the OFDM signal is frequency shifted based on the oscillating signal, to a millimeter wave OFDM signal.

20. The method of claim 11, further comprising:
receiving, by the steerable beam antenna, a beam direction control signal;
in response to receiving the beam direction control signal, steering a direction of the RF transmission beam in accordance with the beam direction control signal, wherein the steerable beam antenna includes:
an RF input/output (I/O) feed,
an array of patch elements, supported on a surface of a substrate, and
a plurality of phase shifting elements, supported by the substrate, each of the phase shifting elements configured to receive the beam direction control signal and, in response, to effectuate a phase delay between the RF I/O feed and a corresponding one of the patch elements.

* * * * *